(12) United States Patent
Albani

(10) Patent No.: US 10,595,579 B2
(45) Date of Patent: Mar. 24, 2020

(54) DYNAMIC AIR INTAKE

(71) Applicant: Ivan Matteo Albani, Villarbasse (IT)

(72) Inventor: Ivan Matteo Albani, Villarbasse (IT)

( * ) Notice: Subject to any disclaimer, the term of this patent is extended or adjusted under 35 U.S.C. 154(b) by 348 days.

(21) Appl. No.: 15/502,048

(22) PCT Filed: Aug. 7, 2015

(86) PCT No.: PCT/IB2015/001337
§ 371 (c)(1),
(2) Date: Feb. 6, 2017

(87) PCT Pub. No.: WO2016/024154
PCT Pub. Date: Feb. 18, 2016

(65) Prior Publication Data
US 2019/0150548 A1 May 23, 2019

(30) Foreign Application Priority Data

Aug. 11, 2014 (IT) ............... TO2014A000653

(51) Int. Cl.
*B01D 53/02* (2006.01)
*A42B 3/28* (2006.01)
(Continued)

(52) U.S. Cl.
CPC .......... *A42B 3/283* (2013.01); *B01D 53/0415* (2013.01); *B01D 53/26* (2013.01);
(Continued)

(58) Field of Classification Search
CPC .. A42B 3/283; B01D 53/0415; B01D 53/261; B01D 2259/455; B60H 3/204
See application file for complete search history.

(56) References Cited

U.S. PATENT DOCUMENTS 4,646,864 A * 3/1987 Racchi ............... B60K 11/08
180/69.22
5,230,719 A 7/1993 Berner et al.
(Continued)

FOREIGN PATENT DOCUMENTS

DE 10 2004 048 742 A1 4/2006
DE 10 2010 026 260 A1 1/2012
(Continued)

OTHER PUBLICATIONS

White et al.: "Fog-harvesting inspired by the Stenocara beetle—An analysis of drop collection and removal from biomimetic samples with wetting contrast", Applied Surface Science, 2013, vol. 284, pp. 826-836.

*Primary Examiner* — Christopher P Jones
(74) *Attorney, Agent, or Firm* — The Belles Group, P.C.

(57) ABSTRACT

A dynamic air intake (A, A') for vehicle, helmet or safety clothing and the like, including a rigid casing (1, 5; 1', 5') having an air inlet opening (A1, A1'), an air outlet opening (A2, A2') and a closed channel (1.4, 1.5, 3, 5; 1', 1.4', 25, 3', 5') for the passage of an air flow passing between said inlet opening (A1, A1') and said outlet opening (A2, A2'), comprising air/water filter separation means including at least one layer (3, 3') of material which absorbs rainwater and/or nebulised water, water vapour, arranged along said channel (1.4. 1.5, 3, 5; 1', 1.4', 25, 3', 5'), without obstructing the cross section of the same channel, in direct contact with said passing air flow and in which water and water vapour, which are transported by said passing air flow, are gradually collected and released to be dispersed towards the outside of said rigid casing.

14 Claims, 21 Drawing Sheets

(51) Int. Cl.
*B01D 53/04* (2006.01)
*B01D 53/26* (2006.01)
*B60H 3/02* (2006.01)

(52) U.S. Cl.
CPC .......... *B01D 53/261* (2013.01); *B60H 3/024* (2013.01); *B01D 2259/455* (2013.01)

(56) References Cited

U.S. PATENT DOCUMENTS

| | | |
|---|---|---|
| 8,156,570 B1 | 4/2012 | Hockaday |
| 2007/0184238 A1* | 8/2007 | Hockaday ................. B32B 7/00 428/98 |
| 2013/0125563 A1 | 5/2013 | Jun et al. |
| 2014/0306522 A1* | 10/2014 | Nagayasu ........... B60R 16/0215 307/10.1 |

FOREIGN PATENT DOCUMENTS

| | | |
|---|---|---|
| JP | 2001-224921 A | 8/2001 |
| JP | 2008-263419 A | 10/2008 |

* cited by examiner

DYNAMIC AIR INTAKE

This is the national stage of International Application PCT/IB2015/001337, filed Aug. 7, 2015.

The present invention relates to a dynamic air intake.

More particularly, the present invention relates to a dynamic air intake for vehicle, helmet or safety clothing and the like.

With the term vehicle, in this description, reference is made to only sport vehicles, such as cars of the "Formula 1" type which are in what follows referred to, for sake of simplicity, as "vehicle".

According to the prior art, vehicles, helmets, safety clothing and the like have one or more air inlet openings provided on the relevant outer surface to allow ventilation of the cabin, for the person's head and/or body, respectively.

However, said air inlet openings, known in the prior art, primarily have the inconvenience of not being able to inhibit, at least in large part, the undesired inlet of water when said vehicle, helmet or safety clothing is used in adverse weather conditions, particularly in the event of heavy rains.

On the other hand, said known openings are not able to allow the user to adjust, inhibit, respectively, the inlet of air and/or water depending on the weather conditions in which said vehicle, helmet or safety clothing and the like is used.

Moreover, said air inlet openings sometimes have the inconvenience of promoting the generation of localized turbulence, resulting in the generation of undesired rustle and noise.

Starting from the notion of such drawbacks of the prior art, the present invention aims to solve them.

An object of the present invention is to provide a dynamic air intake for vehicle, helmet or safety clothing and the like able to inhibit the passage of water, even when used in particularly unfavourable weather conditions, such as heavy rain.

In addition, an object of the present invention is to provide a dynamic air intake as specified which allows the user to adjust, inhibit, respectively, the inlet of air and/or water depending on the weather conditions in which said vehicle, helmet or safety clothing and the like is used.

Moreover, an object of the present invention is provide a dynamic air intake as shown, which greatly reduces the generation of turbulence and consequent noise during use, thus increasing the user's comfort.

On the other hand, it is also an object of the present invention to provide a dynamic air intake as mentioned, which has a simple structure, easy to install and subsequently maintain and clean, as well as relatively low cost.

In view of such objects, the present invention provides a dynamic air intake, the essential feature of which is the object of the main claim, while further advantageous features of the invention are described in the dependent claims.

More specifically, said dynamic air intake for vehicle, helmet or safety clothing and the like, according to the present invention, including a rigid casing having an air inlet opening, an air outlet opening and a closed passage channel of a passing air flow between said inlet opening and said outlet opening, is characterized in that it comprises air/water filter separation means including at least one layer of material absorbing rainwater falling or nebulised by the tires of any other circulating vehicles, as well as water vapour, arranged along said channel, without obstructing the cross section of the same channel, in direct contact with said passing air flow and in which water and water vapour, transported by said passing air flow, are collected and dispersed towards the outside of said rigid casing.

The above claims are intended as integrally reported herein.

The present invention will become more apparent from the detailed description which follows, with reference to the drawing attached thereto, which is purely exemplary and therefore non-limiting, in which.

Figure 1:
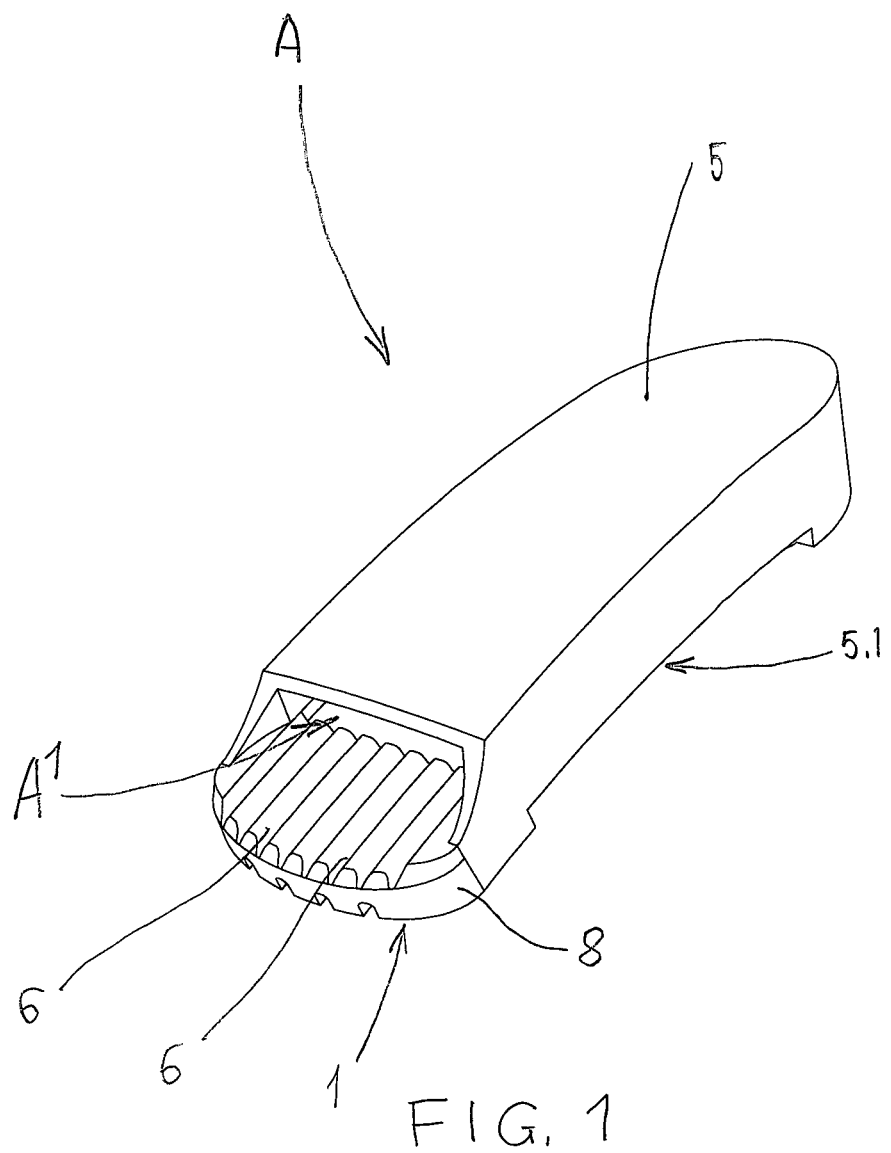
FIG. 1 is a perspective three-quarter front and top view of the dynamic air intake according to a first exemplary embodiment of the invention.
Figure 2:
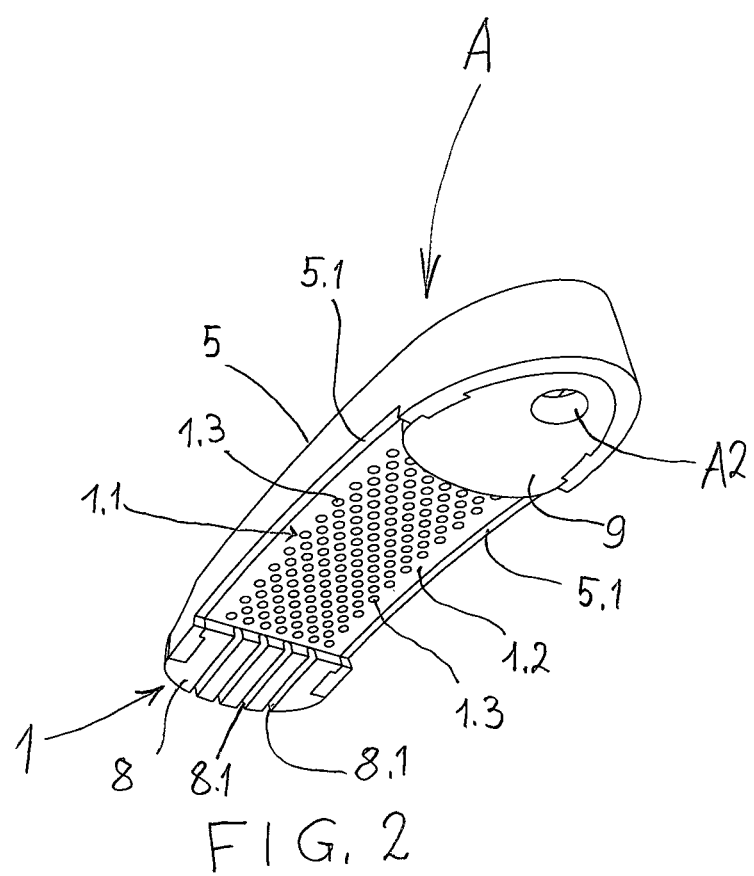
FIG. 2 is a view similar to that in FIG. 1 but rear, from the bottom and on a different scale.

FIRST EXEMPLARY EMBODIMENT OF THE INVENTION (FIGS. 1 to 3 and 6)

Letter A indicates, as a whole, the dynamic air intake according to the present embodiment. Said air intake A includes a rigid casing consisting of a base body 1, made in one piece, for example moulded plastic material, having a structure essentially bridge-like, including two resting legs at the front 8 and rear 9 ends thereof.

On said bridge body 1, a corresponding hollow cover 5 of moulded plastic is elastic-snappingly engaged, forming with said body 1 a rigid box structure, which has a front (with respect to the use arrangement of said air intake) air inlet opening A1, provided at the front leg 8 and which enters a dynamic air flow in said box structure, and a rear air outlet opening A2, provided at the rear leg 9 and which conducts said air flow to the outside of the base body 1 substantially in a direction orthogonal to leg 9 itself.

On the lower surface of said front leg 8 there are provided respective longitudinal grooves 8.1 communicating with a compartment below an intermediate part 1.1 of said body 1, which is raised with respect to the resting surfaces of said legs feet 8, 9. Said cover 5 has, on the side walls thereof, lower notches 5.1, which put said compartment below said intermediate part 1.1 of body 1 in air communication with the outside of the air intake A.

Figure 6:
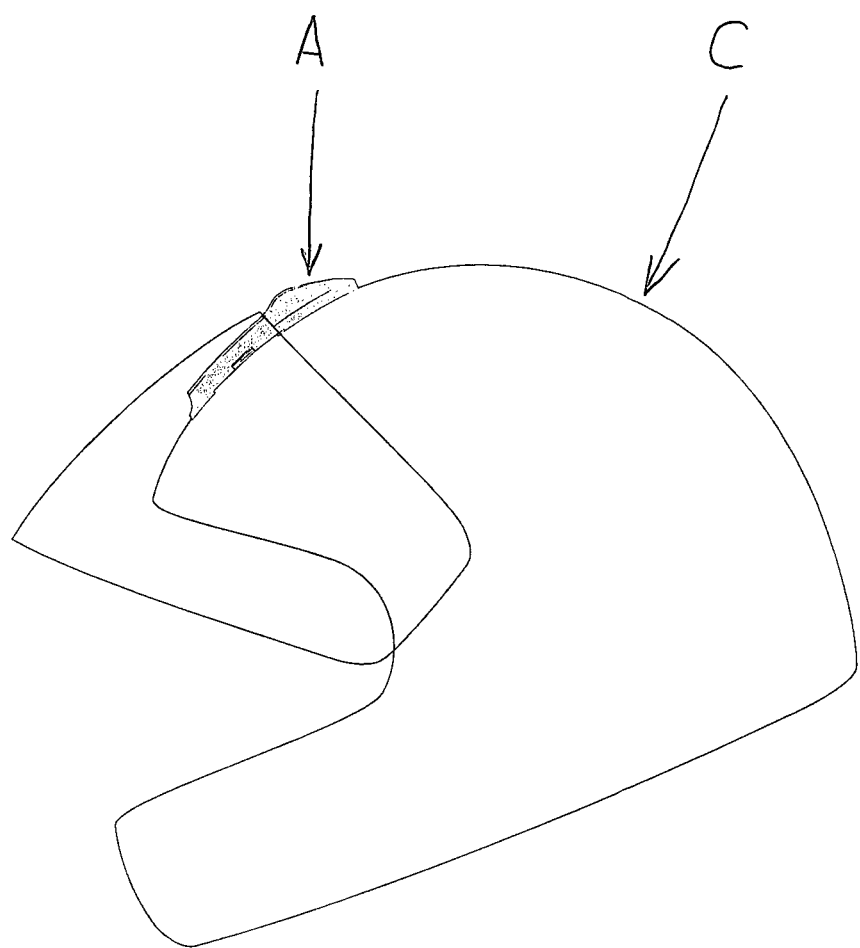
FIG. 6 is a schematic side elevation view of a safety helmet provided with the dynamic air intake, according to the present embodiment.

In said intermediate part 1.1 of said body 1 there is provided a plate bottom 1.2 having a plurality of through holes 1.3 and laterally delimited by raised edges 1.4. The upper surface of said front leg 8 has, at said front opening A1, a plurality of longitudinal grooves 6, in front and substantially at the level of said plate bottom 1.2, while around the rear air outlet opening A2 there is provided, in said box-shaped structure, a raised step 1.5, so that at said bottom 1.2 itself there is provided a seat for air/water filter separation means including a layer of absorbing material 3, laterally enclosed between said edges 1.4, at the front on the groove part 6 and at the back of said step 1.5. Said layer of absorbing material 3 is made for example of a tape of woven fabric, non-woven fabric, open cell sponge or the like, immovably fixed, such as by gluing, to said bottom 1.2 or removable by pressure exerted by prominences arranged in the inside of the hollow cover 5. By way of example, said dynamic air intake A can be fixed to a safety helmet C, as shown in FIG. 6, so that the air outlet opening A2 corresponds to a respective air inlet opening (not shown) provided in helmet C itself.

When helmet C is worn by the person occupying a vehicle moving in the open air, for example in rainy conditions, said air intake A receives air and water through the inlet opening A1.

Figure 14:
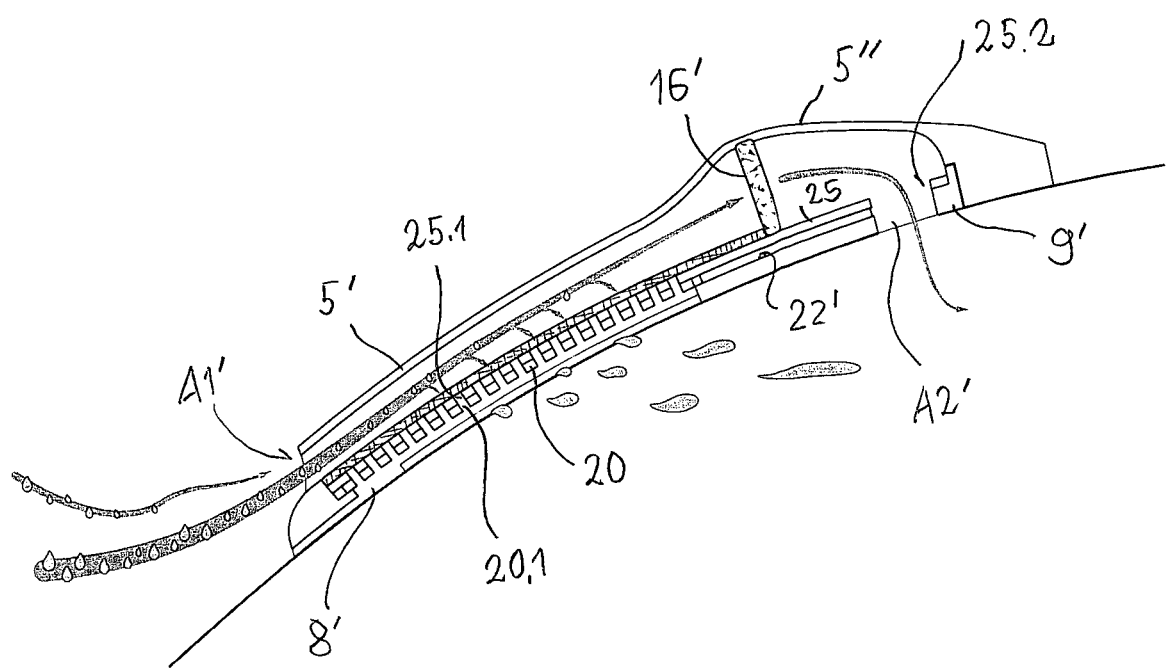
FIG. 14 is a schematic side elevation view similar to that in FIG. 13, but in which the air intake according to this embodiment variant is shown in application to a surface of a body provided with an air inlet hole fed with air passing through said air intake, the water flows ejected in the lower part of said air intake are also shown.
Figure 17:
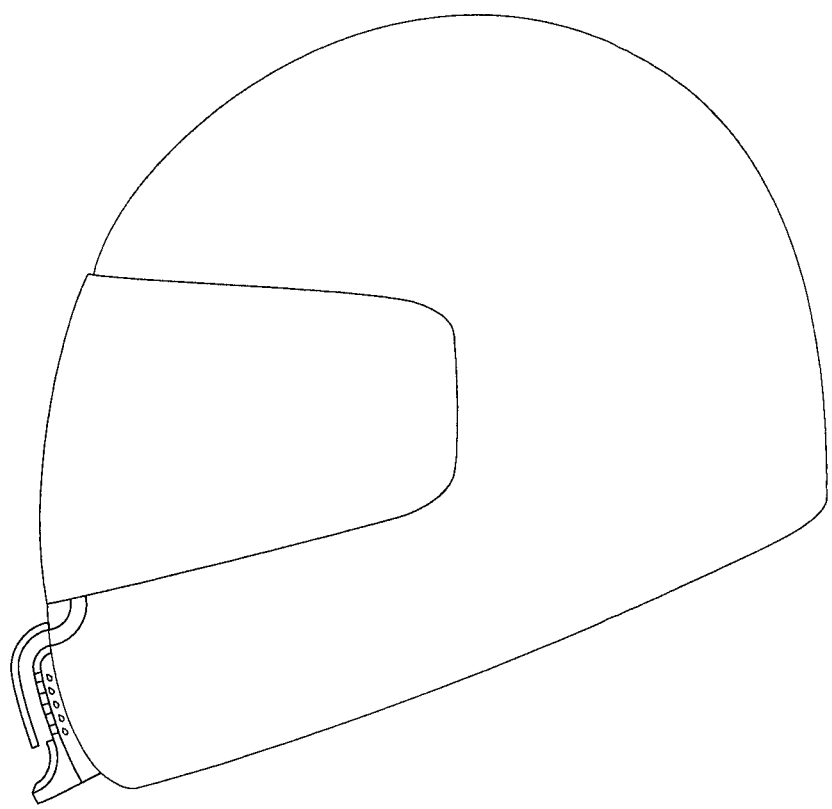
FIG. 17 is a schematic view of a safety helmet provided with the dynamic air intake according to the invention, at an air introduction opening into the helmet itself, underneath a visor of said helmet, in which said air intake and said introduction opening are schematized in vertical section.
Figure 18:
FIG. 18 is a schematic view of a the upper part of a worn safety clothing, provided with the air intake according to the invention at an air introduction opening in the clothing itself (not shown)
Figure 19:
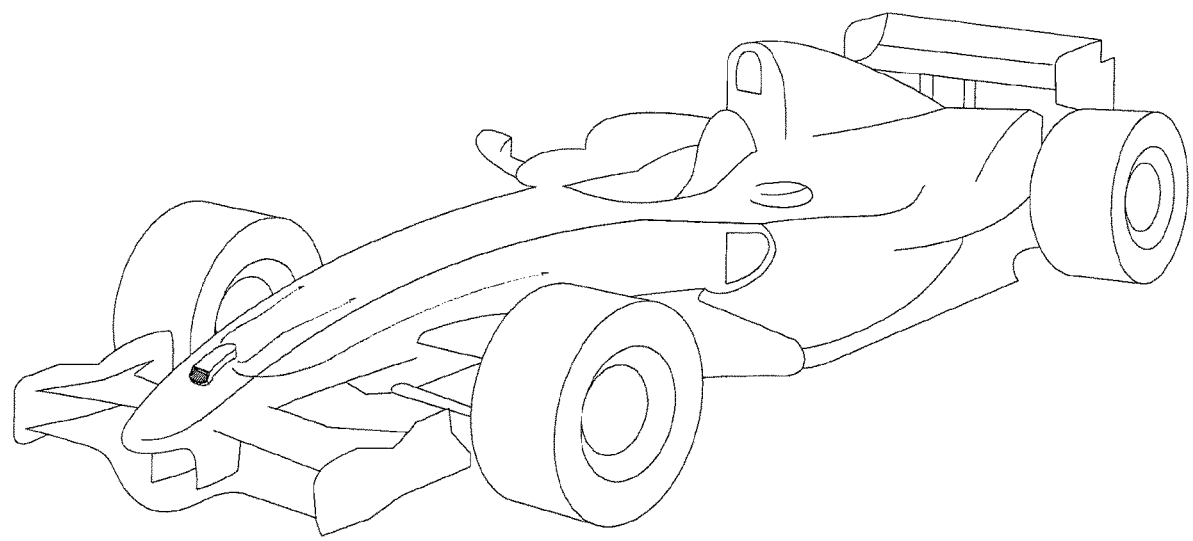
FIG. 19 is a schematic view of a sports vehicle, whose front hood is provided with the air intake according to the invention at an air introduction opening in the hood itself (not shown).

In these conditions, being the filtration plane arranged according to an inclined (FIG. 10) and/or curved (FIG. 17) plane in relation to the vehicle movement or running plane R in a movement direction F4, said grooves 6 which channel the incoming air flow through the front inlet opening A1 according to a plurality of aerodynamic threads, impart a change in direction to the flows according to said inclined plane (FIGS. 10, 14, 17) and due to the resulting vector due to the change in direction of the fluid threads, said grooves 6 carry out a first separation of rainwater from the air due to the different density of the same. A part of the rainwater separated from the air arranges on the bottom of grooves 6, while another part of the same water is introduced through said opening A1 with the incoming air flow passing through said same opening A1 towards the air outlet opening A2, along a closed dynamic air passage channel formed in body 1 between said layer of absorbing material 3, said cover 5, said raised edges 1.4 and said step 1.5 surrounding the air outlet opening A2. It will be seen that said layer of absorbing material 3 does not obstruct the cross section of said closed channel (1.4, 1.5, 3, 5).

The rainwater collected into grooves 6 is introduced, by means of the incoming air, directly into the layer of absorbing material 3, while the residual water carried into the air flow passing through said closed channel (1.4, 1.5, 3, 5), positioned at an angle to the running plane of the vehicle, due to the higher specific weight of air than water and due to the resulting vector due to the change in direction, the liquid phase separates from the gaseous phase, settling on said layer of absorbing material 3, which is thus soaked with water. When said layer of absorbing material 3 is saturated with water, the same gradually flows out through holes 1.3 of said bottom 1.2 of body 1, falling by gravity and/or by the effect of the aerodynamic pressure generated inside said closed channel structure in the compartment below said raised intermediate part 1.1 of said body 1, adjacent to the surface of helmet C.

On the other hand, through said front longitudinal grooves 8.1 of the front leg 8 of body 1, corresponding threads of dynamic air grazing the surface of the helmet itself are introduced, which arrive at said compartment below said raised intermediate portion 1.1 of body 1, and the water droplets that are deposited thereon falling from above are dispersed on the surface of helmet C itself, outside the air intake A.

With reference to the arrangement of use of said air intake with respect to a vehicle, helmet or safety clothing and the like, said air inlet opening A1 is frontal, respectively lateral, while said air outlet opening A2 is rear and is provided inside said rigid casing 1, 5, through a part 9 of the casing itself, so that it conducts said passing air flow outside the casing itself, towards a corresponding air introduction opening, provided in said vehicle, helmet or safety clothing and the like.

First Embodiment Variant (FIGS. 4a-4b, 5a-5b)

Figure 4A:
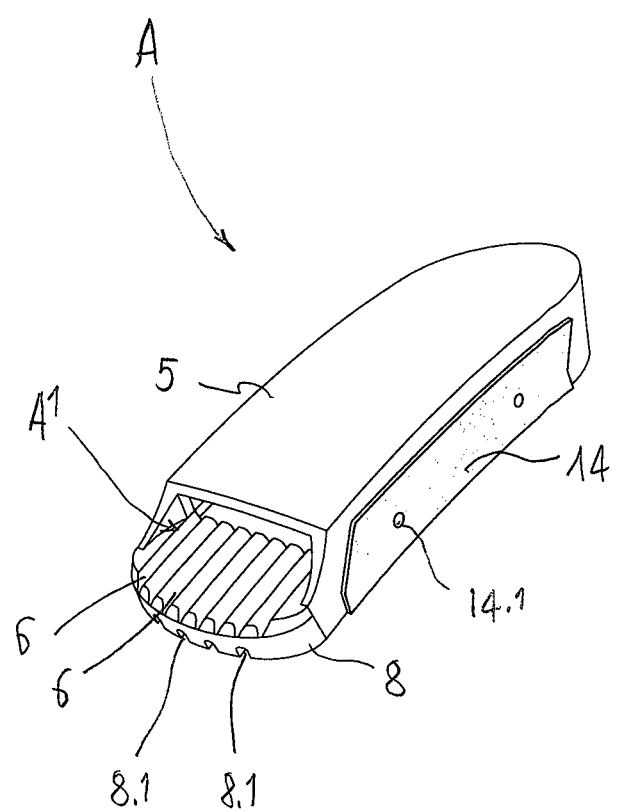
FIG. 4a is a view similar to that in FIG. 1, but showing in a different scale a first variant of said dynamic air intake, in which said air intake is provided with side doors, one of which is visible is shown closed.
Figure 4B:
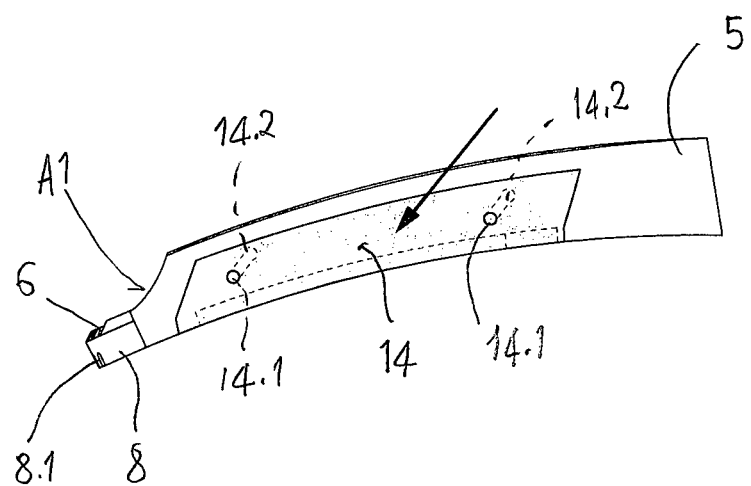
FIG. 4b is a side elevation view of the air intake in FIG. 4a, in which said air intake is provided with lateral doors, one of which visible is shown closed.
Figure 5A:
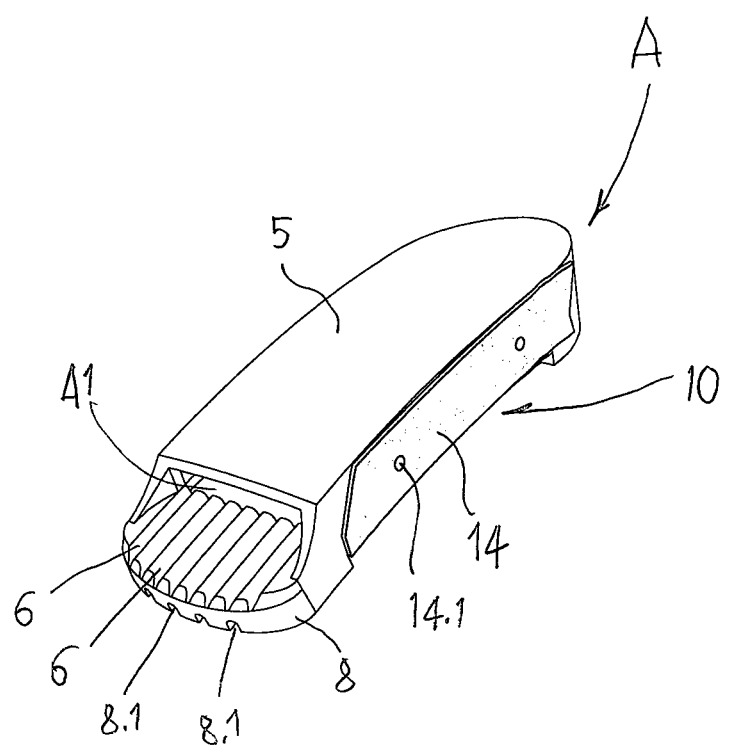
FIG. 5a is a view similar to that in FIG. 1, but showing in a different scale said first embodiment variant of said dynamic air intake, in which said air intake is provided with lateral doors, one of which is visible is shown open.
Figure 5B:
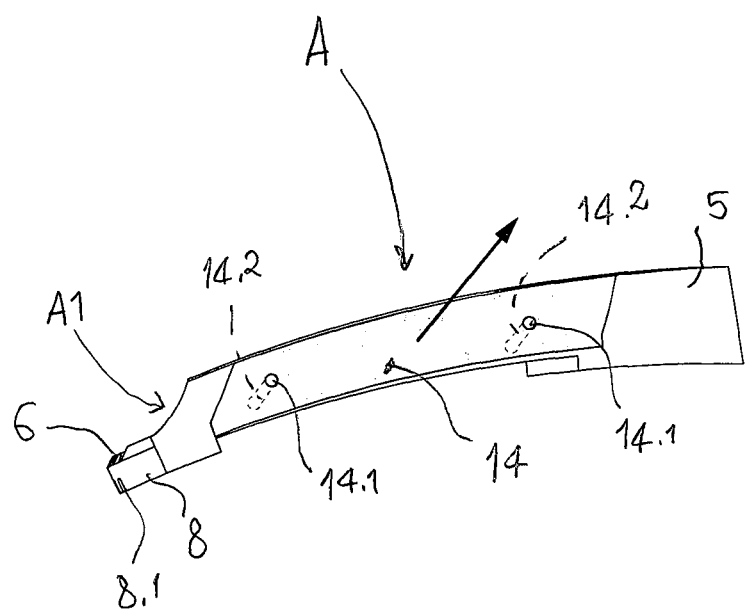
FIG. 5b is a side elevation view of the air intake in FIG. 5a, in which said air intake is provided with lateral doors, one of which visible is shown open.

In the variant shown in FIGS. 4a-4b, 5a-5b, on the side walls of said cover 5 there are provided respective movable doors 14, each of which may be selectively moved between a raised and open position with respect to the surface of helmet C (FIG. 5a-5b), wherein between the air intake A and said helmet C there is provided an air passage gap 10, and a lowered and closed position, in contact with helmet C, wherein said air intake A is laterally closed (FIGS. 4a, 4b).

It will be noted that the air passage gaps 10, provided between said air intake A and helmet C when said doors 14 are in closed position, prevent the air flows passed through the absorbing material 3 from outflowing from said gaps 10, therefore, no load losses due to leakage occur and the air flows reach entirely opening A2.

In particular, said doors 14 are provided movable between said respective open and closed positions by means of a pair of projections 14.1, slidably coupled in respective slots 14.2, formed in each side wall of cover 5.

Said frontal 8 and rear 9 legs of the base body 1 have an aerodynamic shape to facilitate the air flows that impinge the dynamic air intake A and to favor the ejection of water droplets below the intermediate part 1.1 of said body 1.

On the other hand, the aerodynamic shape of said legs 8, 9 of the air intake A restricts the vorticity (turbulence) and reduces sound emissions (noise).

Figure 3:
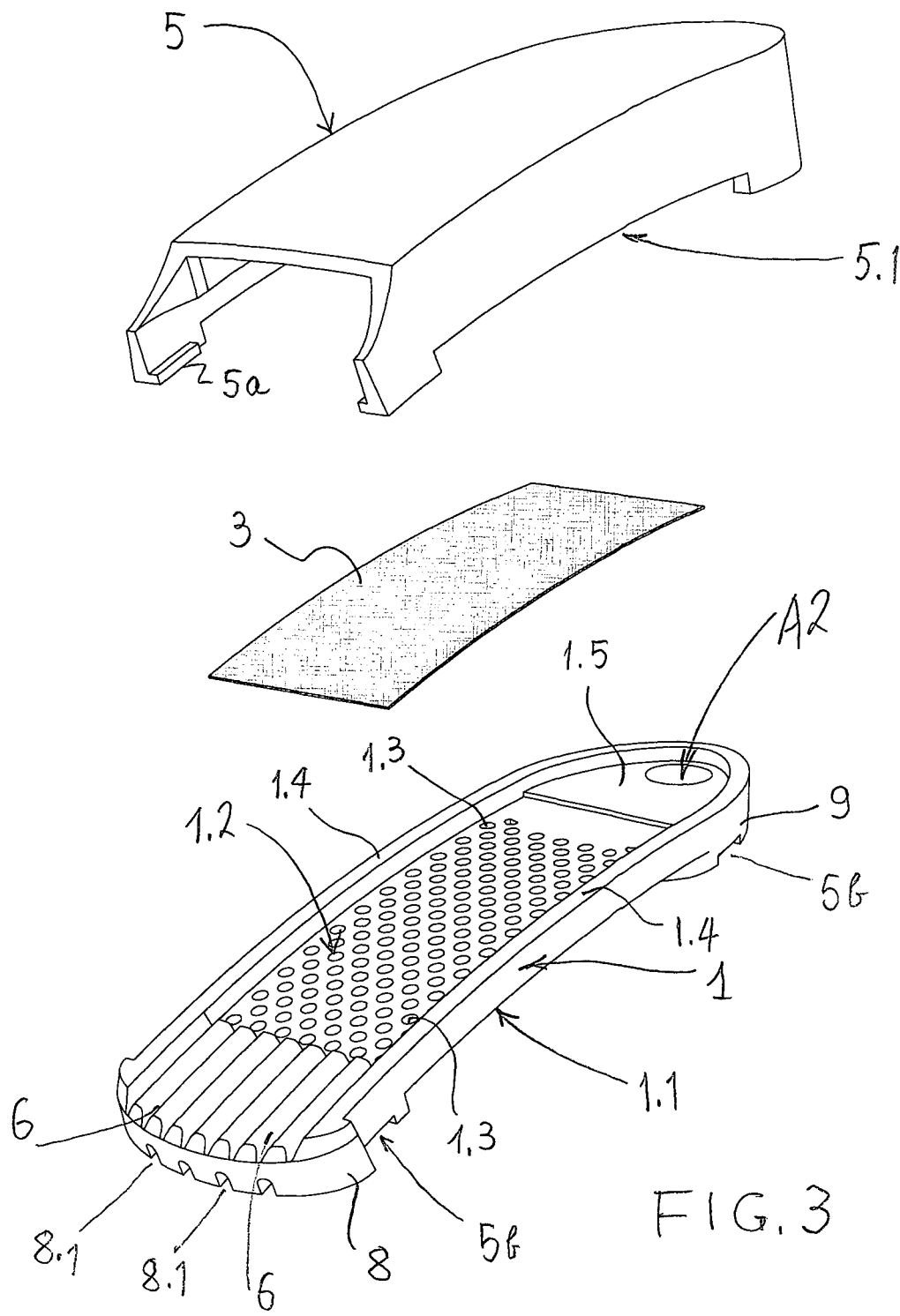
FIG. 3 is an exploded view of the air intake in FIG. 1.

Moreover, cover 5 is, in this embodiment of the invention, elastic-snappingly engaged to the base body 1 by means of interlocking projections 5a engaged in corresponding slots 5b, provided in said base body 1 (FIG. 3).

It goes without saying that the through holes 1.3 provided in said bottom 1.2 may have any shape, their function being to allow the outflow of the water collected in the layer of absorbing material 3 through the bottom itself.

Second Embodiment Variant (FIGS. 7 to 10)

In the description of the present embodiment variant, the parts of the air intake corresponding to those of the first exemplary embodiment described above are indicated by the same reference numerals, and are not further described.

In such a variant, a plate 12, for example of plastic material or metal mesh, is provided with a plurality of through holes 12.1 and is removably housed in shape and/or force coupling in said seat provided at said bottom 1.2 of the base body 1, between the front part with longitudinal grooves 6, the raised step 1.5 and edges 1.4.

In such an arrangement, said through holes 12.1 of said plate 12 correspond with respect to the through holes 1.3 of said bottom 1.2 of the intermediate part 1.1 of the base body 1.

Said plate 12 further has a rear median overhang 12.2, which is partially housed in a corresponding recess 1.51 of said step 1.5. Said stretch of layer of absorbing material 3 is glued on said plate 12, which forms said air/water filter separation means with plate 12 itself, provided in the air intake A.

It will be noted that, when cover 5 is separated from the base body 1, recess 1.51 allows the easy introduction of a tool, such as for example the tip of a screwdriver, to extract plate 12 and layer of absorbing material attached thereto, from the corresponding seat in said bottom 1.2.

Figure 7:
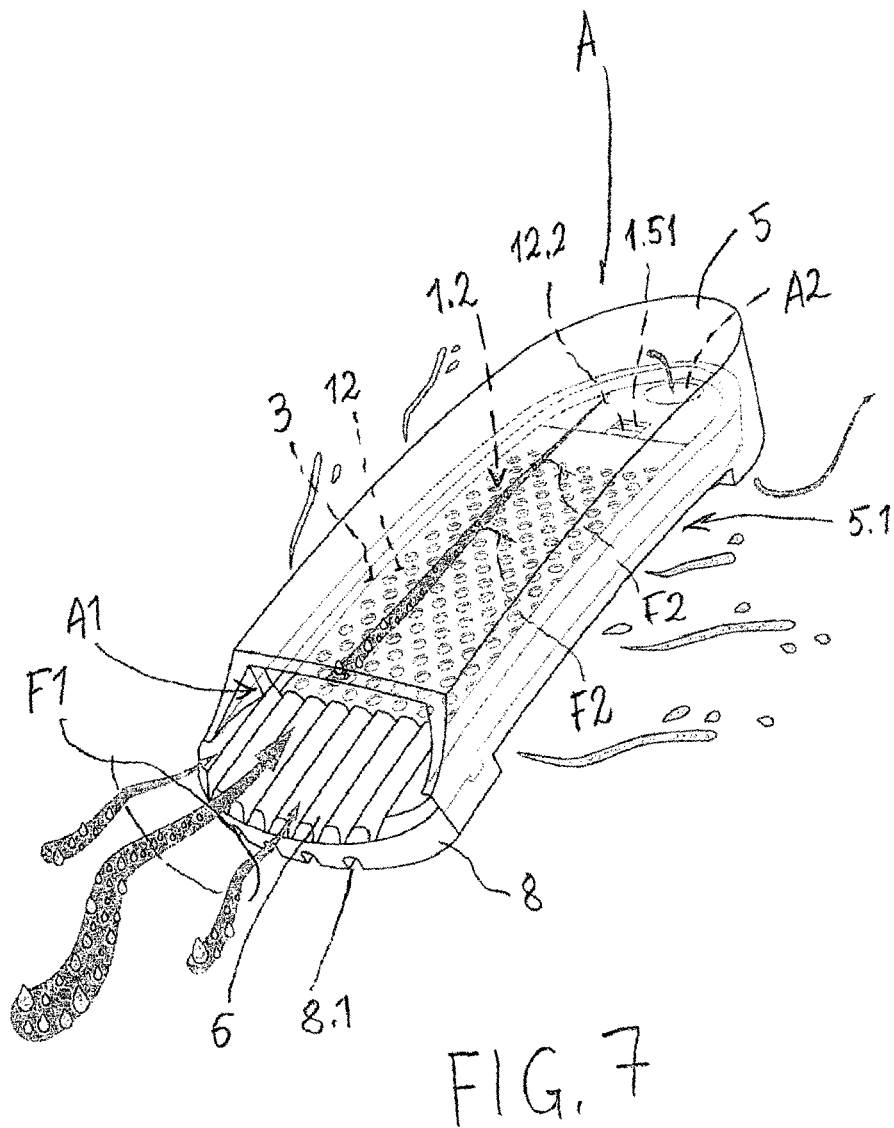
FIG. 7 is a view similar to that in FIG. 1, showing a second embodiment variant of the air intake according to the invention, of which the inside is shown in transparency, being also outlined the air and water flows into and out of the intake itself.
Figure 8:
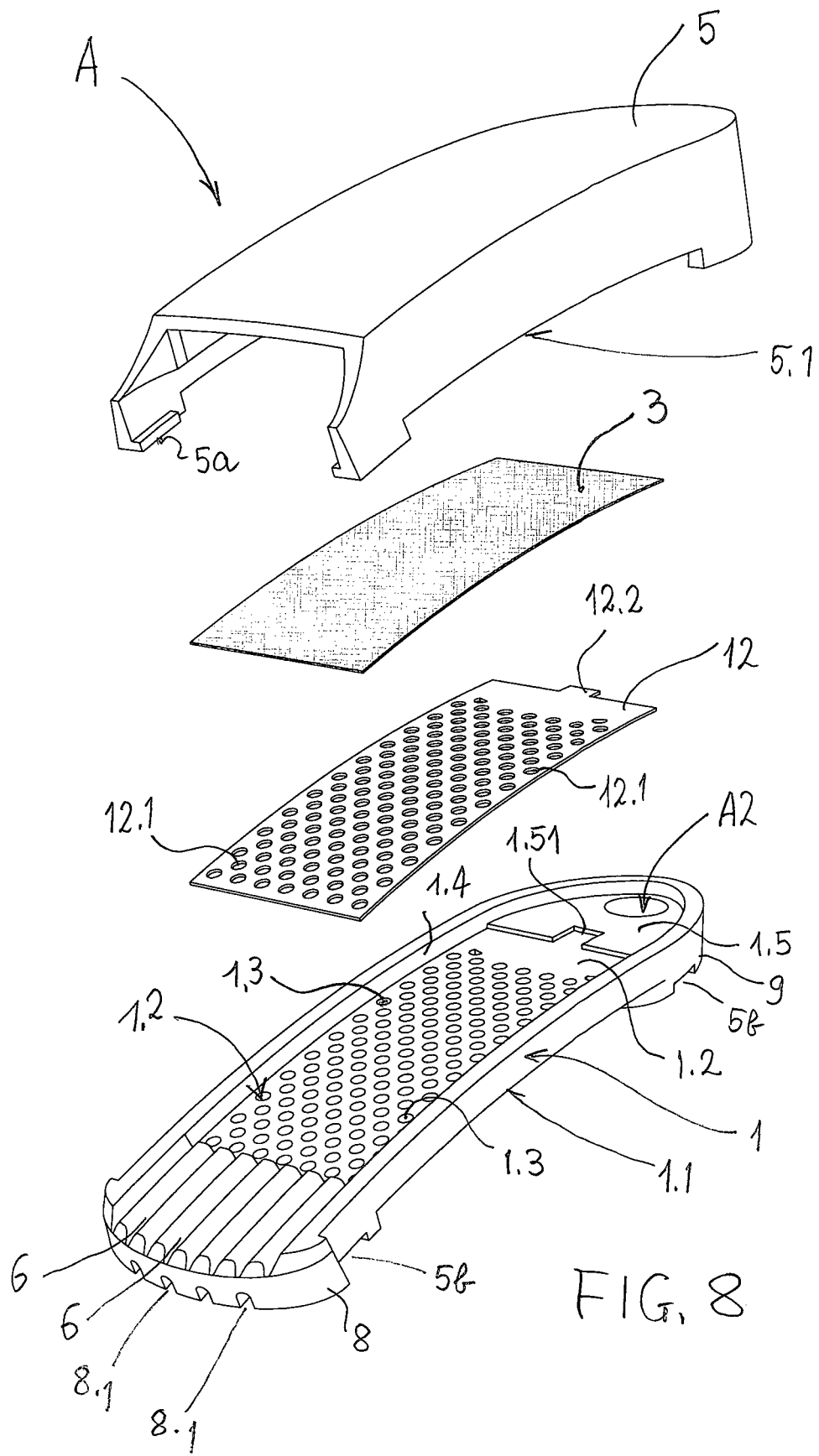
FIG. 8 is an exploded perspective view in a different scale of the air intake in FIG. 7.
Figure 9:
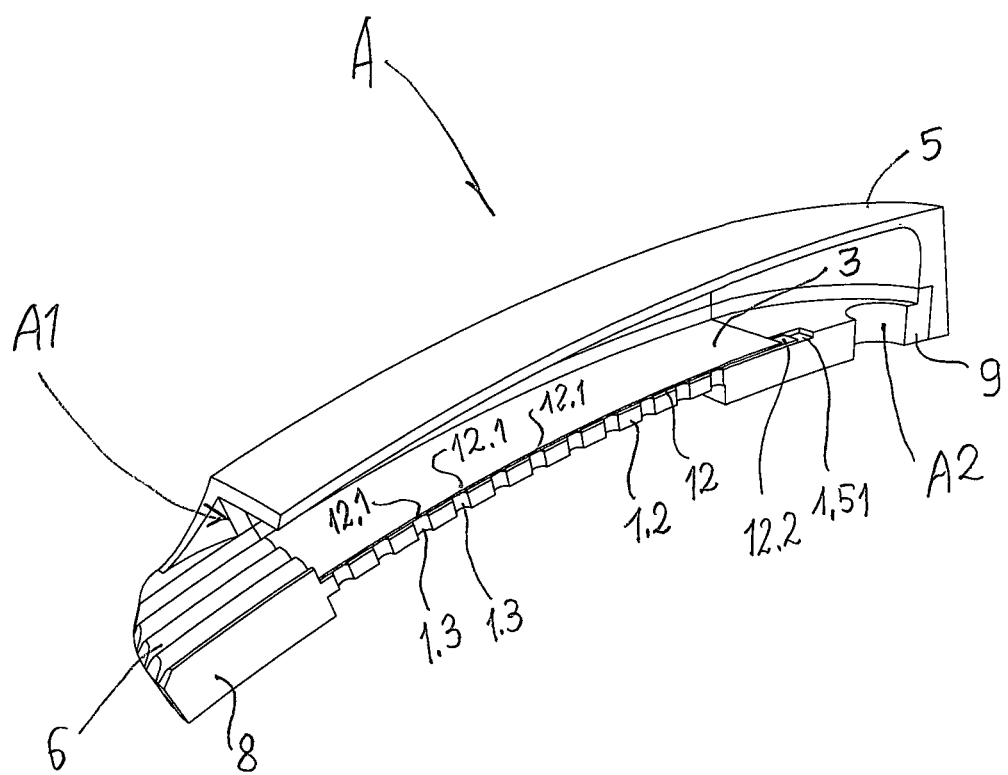
FIG. 9 is a perspective longitudinal vertical section view of the air intake in FIG. 7.
Figure 10:
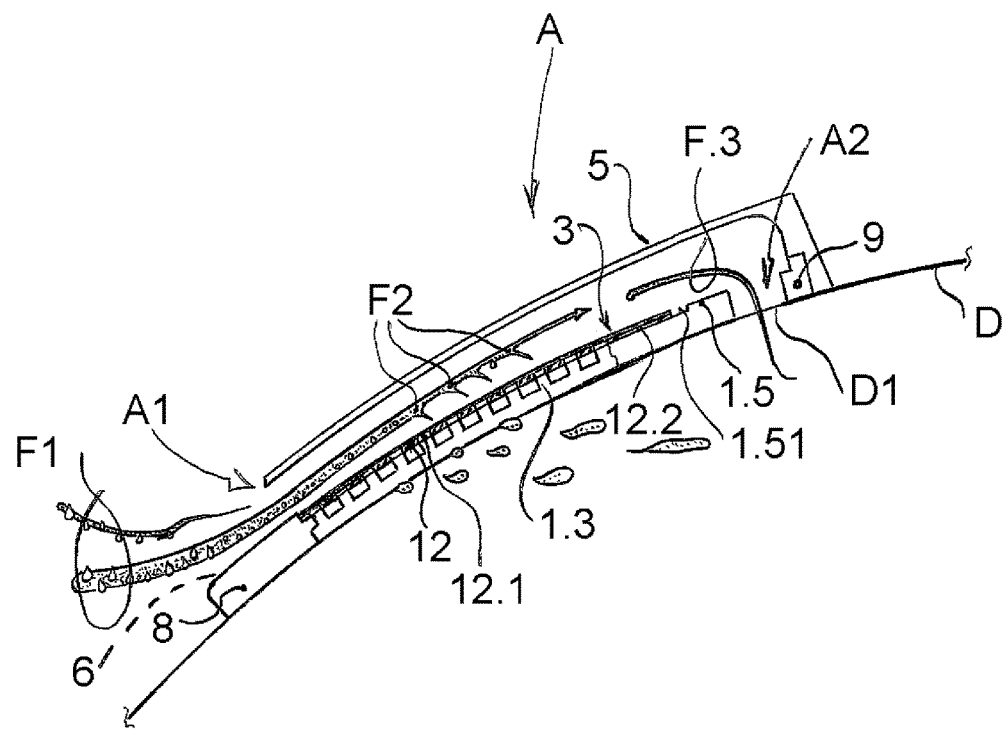
FIG. 10 is a schematic side elevation view similar to that in FIG. 9, but in which the air intake according to this embodiment variant is shown in application to a surface of a body provided with an air inlet hole fed with air passing through said air intake.

With reference in particular to FIGS. 7 and 10, the operation of the air intake A according to the present variant, which is imagined fixed in an inclined position on the surface of a body D (FIG. 10) provided with a through hole D1 of introduction of air into the body itself, is as follows: said frontal grooves 6 channel the incoming air flow F1 through the front inlet opening A1 according to a plurality of aerodynamic threads F2, and perform a first separation of rainwater from the air, due to the resulting vector consequent to the change in direction relative to the running plane of the vehicle and to the different density of the same. A part of the rainwater separated from the air arranges on the bottom of grooves 6, while another part of the same water is introduced, with said threads F2, through said opening A1 towards the air outlet opening A2, along the closed dynamic air passage channel formed in body 1 between said layer of absorbing material 3, said cover 5, said raised edges 1.4 and said step 1.5 surrounding the air outlet opening A2. It will be seen that said layer of absorbing material 3 does not obstruct the cross section of said closed channel (1.4, 1.5, 3, 5).

The rainwater collected into grooves 6 is introduced, by means of the incoming air, through opening A1, directly into the layer of absorbing material 3, while the residual water carried by said air threads F2 through said closed channel (1.4, 1.5, 3, 5), is further separated by the passing air flow due to the resulting vector due to the inclination of said air intake A relative to the running plane and to the different density of the liquid phase from the gaseous phase, settling on said layer of absorbing material 3, which is thus soaked with water. When said layer of absorbing material 3 is saturated with water, the same gradually outflows through holes 12.1 of plate 12 and holes 1.3 of said bottom 1.2 of body 1, falling by gravity and/or ejected due to the aerodynamic pressure (present inside said closed channel) in the compartment below said raised intermediate part 1.1 of said body 1, in contact with the surface of body D. The residual part F3 of said air flow F1 entering through the front opening A1 is conveyed in said closed channel (1.4, 1.5, 3, 5) up and through said outlet opening A2, placed at hole D1 of introduction of air in body D, through which said residual flow F3 is channeled.

On the other hand, through said front grooves 8.1 of the front leg 8 of body 1, corresponding threads of dynamic air grazing the surface of body D are introduced, which arrive at said compartment below said raised intermediate portion 1.1 of body 1, and the water droplets that are deposited thereon falling from above are dispersed on the surface of body D itself.

The present embodiment variant is provided to facilitate the periodical cleaning of said layer of absorbing material 3 of the air/water filter separation means. In fact, once cover 5 has been removed, the assembly formed by said layer of absorbing material 3 and the corresponding support plate 12 can be easily extracted, cleaned and replaced, after cleaning, in said base body 1, thus closing the whole with cover 5.

On the other hand, in bottom 1.2 of said intermediate part 1.1 of said base body 1 there may be provided, in place of said plurality of through holes 1.3, a single opening. In such a case, there may be provided projections overhanging for example from edges 1.4 towards the inside of the base body 1, on which said plate 12 may directly removably rest, with its lower side, while on the opposite side it supports said stretch of layer of absorbing material 3.

In a further embodiment variant, said absorbing layer may be made of a water-permeable rigid material, such as metallic or laser micropierced polimeric films or porous materials such as ceramics and the like. Therefore, it may be arranged removable at said opening (provided instead of said plurality of said through holes 1.3), and maintained by pressure applied by protrusions provided in the inner part of the hollow cover 5, omitting in this case the support plate 12.

Summarizing, said at least one layer of absorbing material can be overlapped with respect to a plate having at least one opening for the outflow of the water, collected in said at least one layer of absorbing material, and said plate can be removably supported with respect to said base portion and form said bottom portion of said intermediate part of said base body.

In this case, the operation of the air intake A would not change with respect to what described above.

Second Exemplary Embodiment Of The Invention (FIGS. 11 to 16a -16d)

In the description of the present second embodiment, the parts of the dynamic air intake corresponding to those of the first exemplary embodiment described above are indicated by the same reference numerals, followed by an apex (') and are not further described.

Letter A' indicates, as a whole, the dynamic air intake according to the present embodiment. Said air intake A' includes a rigid casing formed by a base body 1', having a structure substantially bridgelike, including two resting legs, at its ends, front 8' and rear 9', as in the first embodiment described above.

On said bridge body 1', a corresponding hollow cover 5' is elastic-snappingly engaged, forming with said body 1' a rigid box structure, which has a front (with respect to the use arrangement of said air intake) air inlet opening A1', provided at the front leg 8' and which enters a dynamic air flow in said box structure, and a rear air outlet opening A2', provided at the rear leg 9' and which conducts said air flow to the outside of the base body 1' substantially in a direction orthogonal to leg 9' itself.

On the lower surface of said front leg 8' there is provided a median longitudinal groove 8.1' communicating with a compartment of said box-shaped structure below an intermediate part 1.1' of said bridge body 1', which is raised with respect to the resting surfaces of said legs feet 8', 9'. Said cover 5' has, on the side walls thereof, lower notches 5.1', which put said compartment below said intermediate part 1.1' of body 1' in air communication with the outside of the air intake A'.

In each of said lower notches 5.1' of said cover 5' there is also provided a median recess 5.2'.

In said intermediate part 1.1' of said body 1' there is provided a wide opening 1.2', open at said intermediate part 1.1' itself. In said opening 1.2', a pair of front opposing support tabs 1.21' and a rear support base 1.22' protrude, coplanar and connected to each other by a pair of opposing longitudinal lateral coplanar ribs 1.25', adjacent to respective side edges 1.4' of said intermediate part 1.1'. Said tabs 1.21' are connected by means of a coplanar crossbar 1.24'. In an intermediate position in said edges 1.4' there are provided respective opposing notches 1.41', which correspond to said notches 5.2' provided in the side walls of cover 5'.

A step 1.23' rises on base 1.22', centrally crossed by a longitudinal groove 1.26' which leads into said air outlet opening A2'.

In said opening 1.2' of the intermediate part 1.1' there is slidably housed a corresponding first plate 20, for example of plastic material, having a plurality of through holes 20.1, the front side of which is supported by said front tabs 1.21', and whose rear part is supported by said rear support base 1.22'. Said plate 20 has a pair of side tabs 21, coplanar and projecting through and beyond said notches 1.41' of edges 1.4'. Said plate 20 also has a rear intermediate longitudinal finger 22, projecting and sliding in said groove. 1.26' of said step 1.23', which leads into opening A2'. A pair of lateral opposing stop projections 22.1 extends from said finger 22. Said plate 20 is also slidably supported on said opposing lateral longitudinal ribs 1.25', between an advanced position towards the front leg 8', in which the front end of plate 20 itself abuts against a corresponding part of said leg 8', while the rear finger 22 does not interfere in the rear air outlet opening A2', and a retracted position, in which the stop projections 22.1 abut against said step 1.23', while the rear finger 22 completely obstructs said air outlet opening A2'. The longitudinal displacement of said plate 20 is determined by manually acting on said side tabs 21, projecting beyond edges 1.41', while the width of notches 1.41' and corresponding recesses 5.2' of cover 5, in which said tabs 21 are moved, determines the stroke length in both directions of said plate 20.

A second plate 25, for example of plastic material, is superimposed to said first plate 20 and is fixedly contained inside said intermediate part 1.1' of said base body 1' and supported at the front against a corresponding part of said leg 8' and posteriorly on said step 1.23', so as to allow the underlying first plate 20 to slide as described above.

Said second plate 25 has a plurality of through holes 25.1, which substantially correspond in shape and arrangement to said through holes 20.1 of said first plate 20.

Moreover, said second plate 25 has at its rear end a further through hole 25.2 corresponding in shape and arrangement to said air outlet hole A2'. On said second plate 25, substantially at said plurality of through holes 25.1 there is fixed, for example glued, a stretch of layer of absorbing material 3' of air/water filter separation means. Moreover, between said second plate 25 and the inner surface of cover 5', in the vicinity of said layer of absorbing material 3' and of said air outlet opening A2' there is fixed a transverse filter baffle 16', which at least partially obstructs the cross section of the closed channel of passage of the incoming air flow from said opening A1', defined between said base body 1' with edges 1.4', said layer of absorbing material 3', said second plate 25' and said cover 5'.

The function of said baffle 16' is to further separate air/water in the air flow passing towards the next air outlet opening A2', as well as retain any impurities suspended in the air. Said baffle 16' is air-permeable.

It may be made, for example, of the same material as the absorbing layer 3'.

Figure 12:
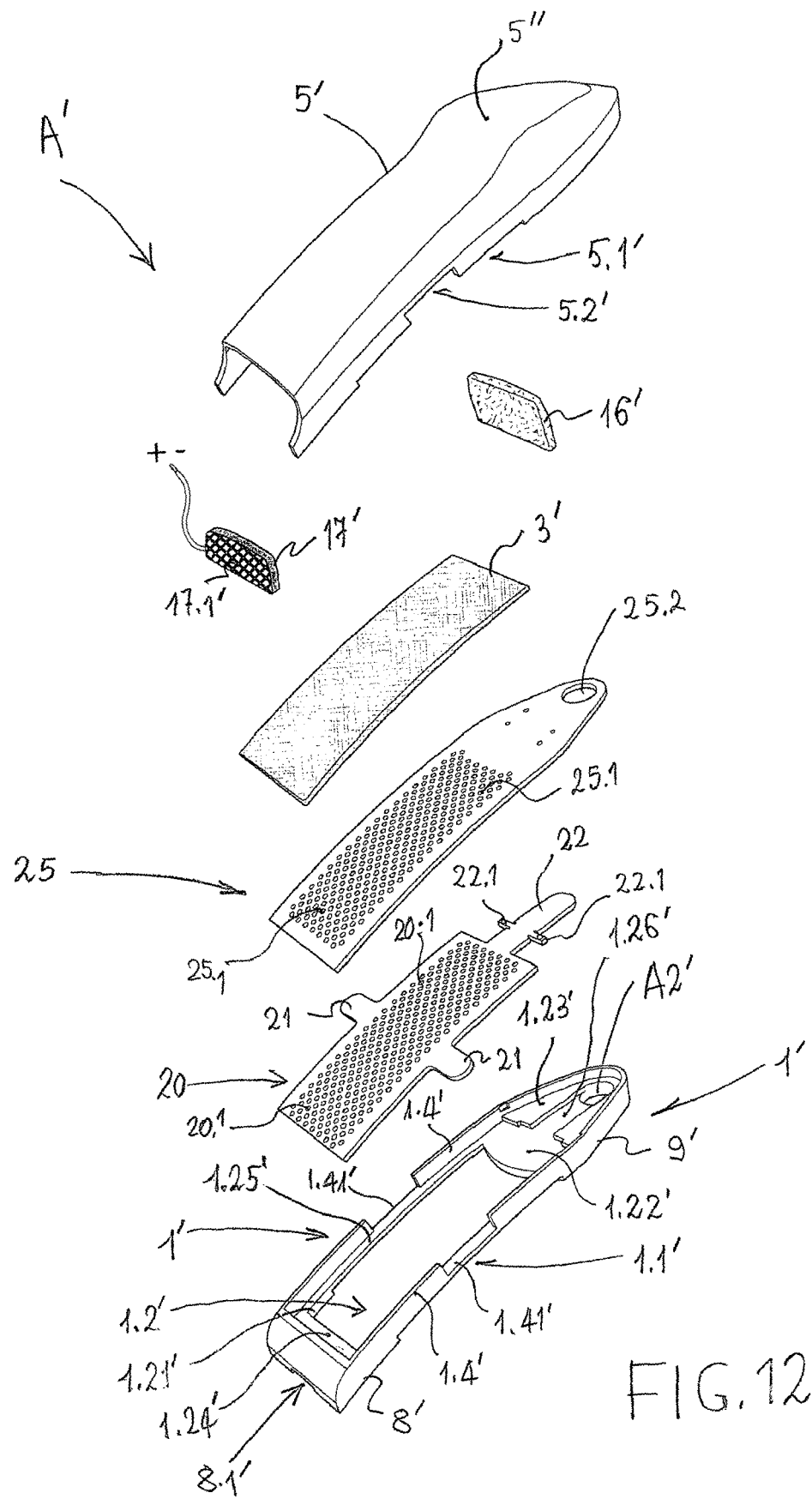
FIG. 12 is an exploded perspective view in a different scale of the air intake in FIG. 11.
Figure 13:
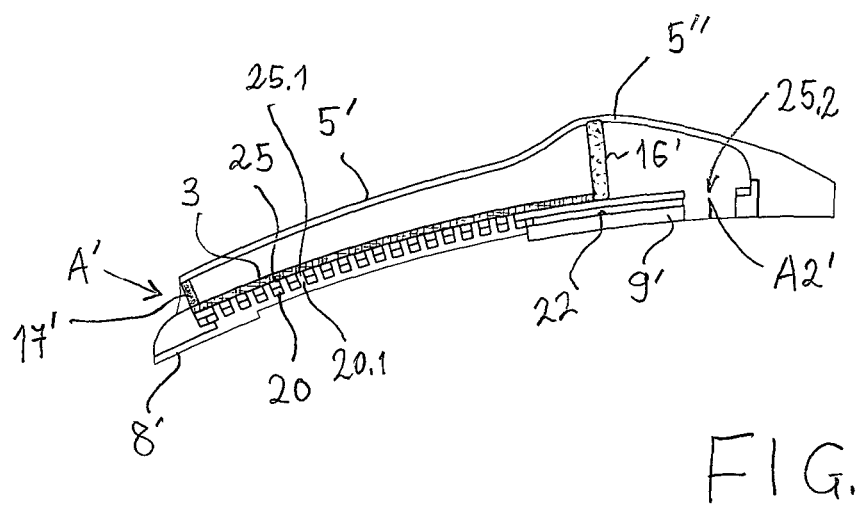
FIG. 13 is a longitudinal vertical section view of the air intake in FIG. 11.

In the vicinity of the air inlet opening A1' there is further arranged a heating pad 17', constituting an electrical resistance 17.1' and electrically connected to an electrical power control circuit, simply schematized in FIG. 12.

The function of said heating pad 17' is to mitigate the incoming air flow in said air intake, or melting the snowflakes, which could otherwise clog said openings in the air intake itself, in winter operating conditions.

Figure 11:
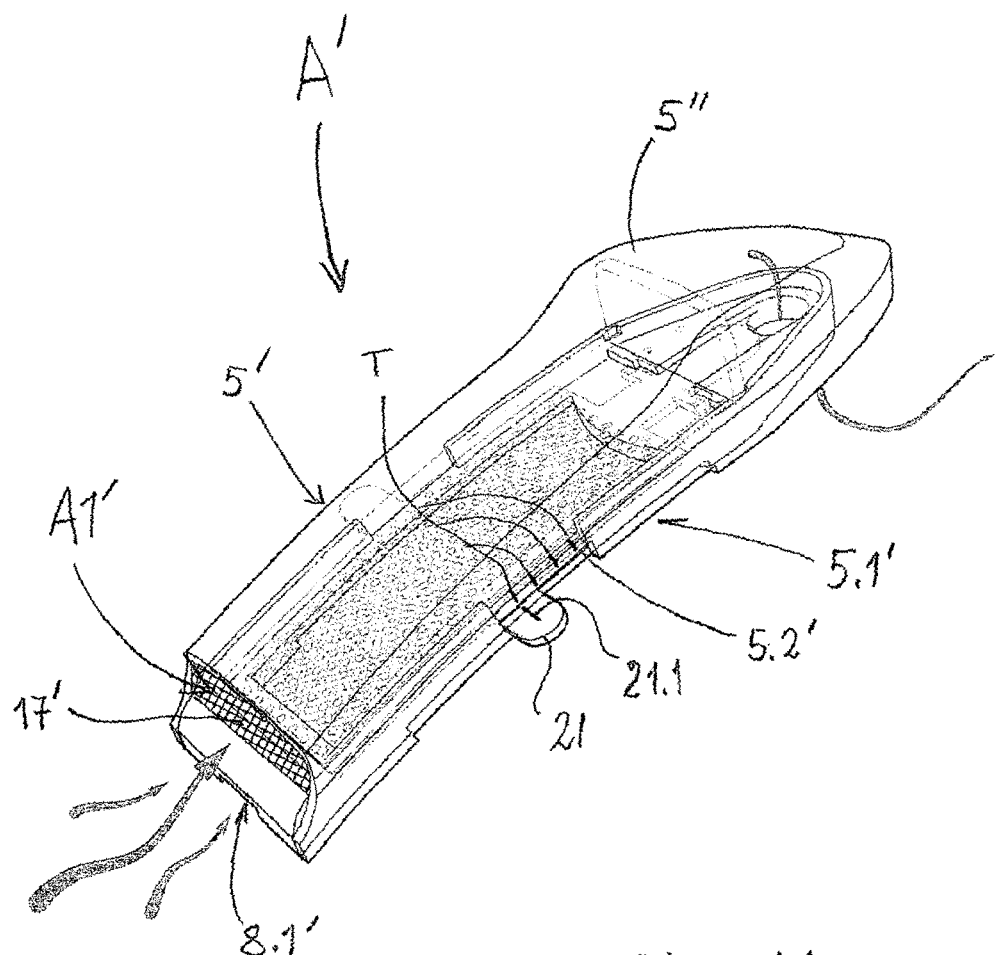
FIG. 11 is a view similar to that in FIG. 1, showing a third embodiment variant of the air intake according to the invention, of which the inside is shown in transparency, being also outlined the air flows into and out of the intake itself.
Figure 15:
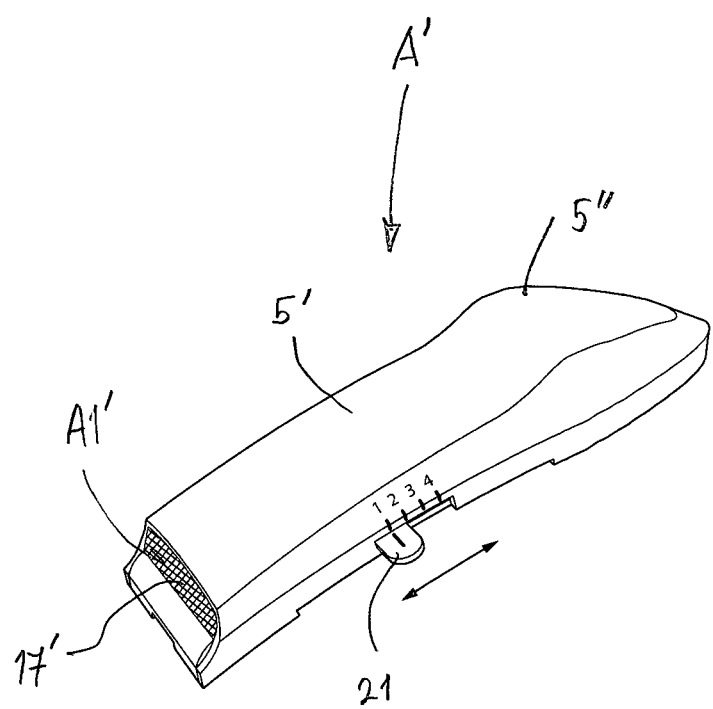
FIG. 15 is a view similar to that in FIG. 11, but in a different scale and in which respective reference numerals indicate notches of a graduated adjustment scale of a selector device for the selective shut-off of the air flow, with which the air intake according to this embodiment variant is provided.

As indicated in FIG. 11, on a side wall of cover 5', at a side tab 21 of said first sliding plate 20, there are provided four reference notches T (which, in FIG. 15, are respectively denoted by reference numerals 1, 2, 3, 4), which can be matched, by sliding said first plate 20, with an index 21.1 associated with said tab 21. In this way, it is possible to select four different relative positions between said first sliding plate 20 and said second fixed plate 25, overlapping each other.

Said four relative positions are schematized in FIGS. 16a to 16d, respectively, which show the respective positions of said plates 20, 25 corresponding to said notches 1, 2, 3, 4.

Figure 16A:
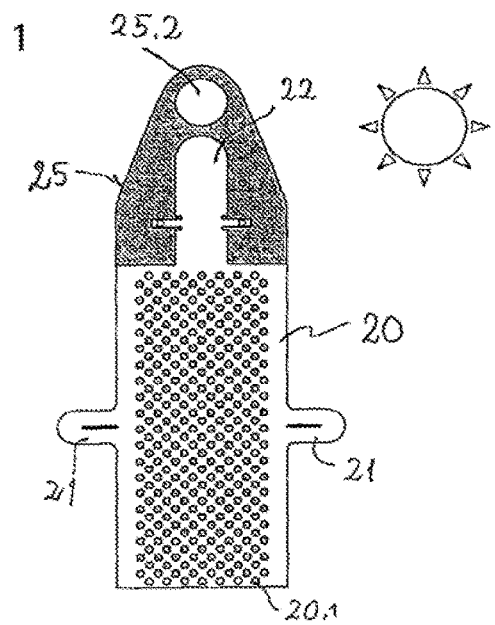
FIGS. 16a to 16d show schematically and with symbols and in a bottom view different selection positions of said selector device.

With reference to FIG. 16a, showing the relative position "1", holes 25.1 of the second plate 25 and holes 20.1 of the first plate 20 are mutually offset, thus not corresponding, and finger 22 of plate 20 does not interfere with hole 25.2 corresponding to opening A2'. This condition does not allow the passage of air and/or water through said layer of absorbing material 3. On the other hand, the passage of the incoming air flow from opening A1' up and through the air outlet opening A2' is allowed.

Figure 16B:
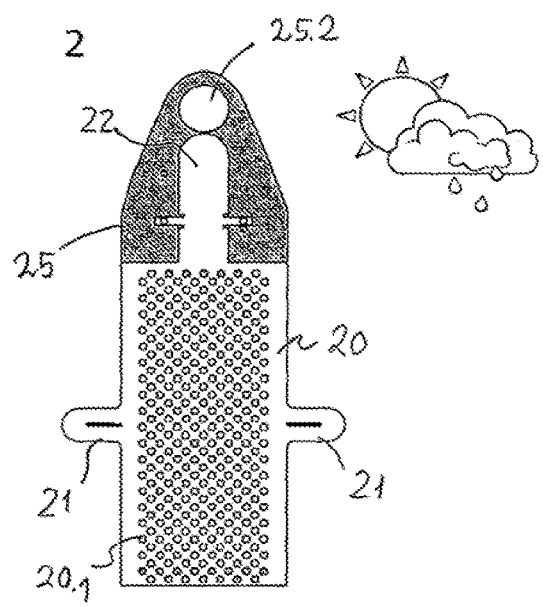

With reference to FIG. 16b, showing the relative position "2", holes 25.1 of the second plate 25 and holes 20.1 of the first plate 20 are mutually corresponding, and finger 22 of plate 20 does not interfere with hole 25.2 corresponding to opening A2'. Such a condition allows the passage of the liquid phase and partly of the air through said layer of absorbing material 3'. Moreover, the passage of the incoming air flow from an opening A1' up and through the air outlet opening A2' is allowed.

Figure 16C:
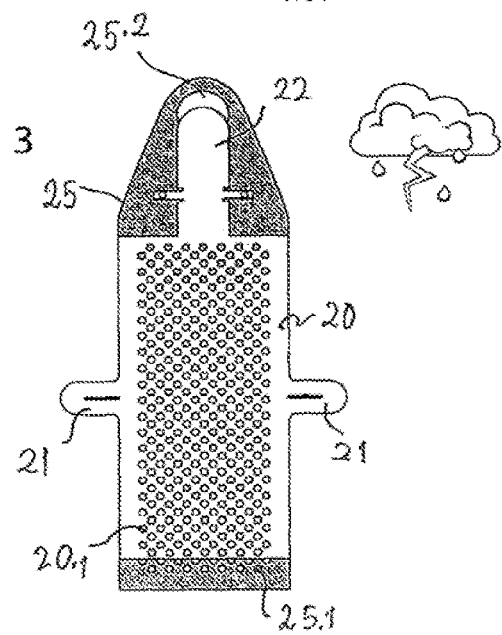

With reference to FIG. 16c, showing the relative position "3", holes 25.1 of the second plate 25 and holes 20.1 of the first plate 20 are mutually corresponding, and finger 22 of plate 20 partly interferes with hole 25.2 corresponding to opening A2'. Such a condition allows the passage of the liquid phase and partly of the air through said layer of absorbing material 3'. Moreover, the passage of the incoming air flow from an opening A1' up and through the air outlet opening A2', partly obstructed by the end of finger 22, is allowed to a limited extent.

Figure 16D:
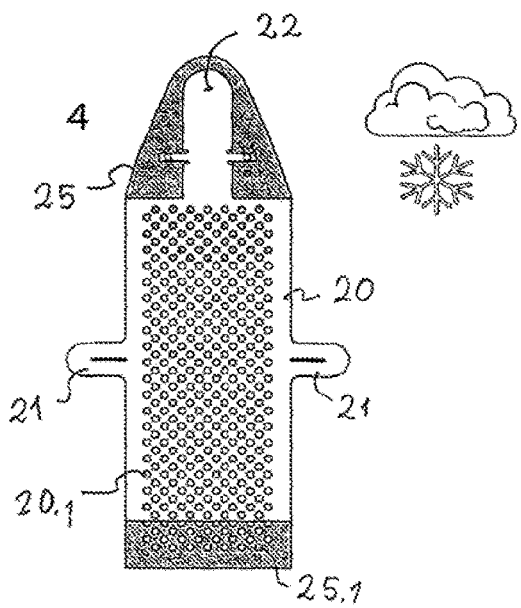

With reference to FIG. 16d, showing the relative position "4", holes 25.1 of the second plate 25 and holes 20.1 of the first plate 20 are mutually corresponding, and finger 22 of plate 20 totally closes hole 25.2 corresponding to opening A2'. This condition allows the passage of air and/or water through said layer of absorbing material 3'. On the other hand, the passage of the incoming air flow from opening A1' through the air outlet opening A2' is not allowed.

It will be seen that cover 5' has, at the transverse baffle 16', a bulge 5'' with aerodynamic shape, allowing a variation of volume inside said cover 5, in order to increase the filtering surface of said baffle 16'; in the possible application of the same to a safety helmet with visor, said bulge is positioned so as not to interfere with the opening of the visor, such as shown in FIG. 6, related to the first embodiment.

With exemplary reference to FIGS. 6, 17 to 19, as well as FIGS. 16a to 16d, some operating conditions of the dynamic air intake according to the invention, applied to a motor vehicle, a helmet or safety clothing, are described.

The operating condition of the air intake A', as schematized in FIG. 16a (position 1), is selected by the user on a hot day with the sun, since the non-corresponding holes of plates 20 and 25 do not allow the passage of air through the absorbing layer 3', and therefore inside the helmet, or the clothing, or the passenger compartment of a motor vehicle provided with said air intake, the maximum air flow coming from the inlet opening A1' through the outlet opening A2', fully open, of the air intake A' flows.

The operating condition of the air intake A', as schematized in FIG. 16b (position 2), is selected by the user, for example on a rainy day but with a mild climate, since the corresponding holes of plates 20 and 25 allow filtering the water through the absorbing layer 3, and therefore the air introduced through the inlet opening A1' escapes through the outlet opening A2', fully open, dry to ventilate the helmet, clothing, compartment, respectively.

The operating condition of the air intake A', as schematized in FIG. 16c (position 3), is selected by the user, for example in case of pouring rain and on a cool day, because the corresponding holes of plates 20 and 25 allow filtering the water, which flows out sideways to the air intake A1, after crossing the absorbing layer 3. The air introduced through the inlet opening A1' crosses to a limited extent the air outlet opening A2', partially obstructed by finger 22, and therefore there is a limited entry of air into the helmet, clothing, compartment or the like, not to over-cool the user.

The operating condition of the air intake A', as schematized in FIG. 16d (position 4), is selected by the user, for example on a winter day. The air introduced through the inlet opening A1' does not come out of the outlet opening A2', completely obstructed by said finger 22, and therefore it does not enter into the helmet, clothing, compartment, respectively, not to cool the user.

While the above describes the air intake according to the invention including a bridge-like base body, however, the intake itself can be fixed on a vehicle, helmet or safety clothing and the like using a single support (rather than two opposites ones, as in the case of the bridge structure), being in this case the intermediate part raised cantilevered relative to the surface of said vehicle, helmet or safety clothing and the like.

As is clear from what described thus far, said dynamic air intake for vehicle, helmet or safety clothing and the like, according to the present invention, is able to inhibit the passage of water, even when used in particularly unfavourable weather conditions.

In addition, said dynamic air intake as specified allows the user to adjust, inhibit, respectively, the inlet of air and/or water depending on the weather conditions in which said vehicle, helmet or safety clothing and the like is used.

Moreover, said dynamic air intake as shown greatly reduces the generation of turbulence and consequent noise during use, thus increasing the user's comfort.

On the other hand, said dynamic air intake as mentioned has a simple structure, easy to install and subsequently maintain and clean, as well as relatively low cost.

As it appears from the above description, the present invention allows the objects described in the introduction to be achieved in a simple and advantageous manner.

The invention claimed is:

1. A dynamic air intake for a vehicle, a helmet or safety clothing, the dynamic air intake including:
    a rigid casing having an air inlet opening, an air outlet opening and a closed channel for the passage of an air flow between said inlet opening and said outlet opening, when said dynamic air intake provided on said vehicle, said helmet or said protective clothing worn by a person is moving in open air on a running plane in a movement direction;
    said closed channel including at least one layer of material which absorbs rainwater and/or nebulised water, said at least one layer of material arranged along said closed channel without obstructing the cross section of the same channel, in direct contact with said air flow so that liquid water, which is transported by gaseous air of said air flow, is collected in said at least one layer of material;
    wherein said closed channel is positioned at an angle to the said running plane of the vehicle, the helmet or the safety clothing, and wherein said at least one layer of material has a forward orientated surface, with respect to said movement direction, in direct contact with said air flow, the forward orientated surface being at an angle with respect to the said running plane so that, due to the lower specific weight of the gaseous air as compared to the liquid water and due to the resulting change in direction of the open air as the open air becomes the air flow, the liquid water of the air flow separates from gaseous air of the air flow, the liquid water settling on said at least one layer of material; and
    wherein when said at least one layer of material is saturated with the liquid water, the liquid water is dispersed towards an outside of said rigid casing through said at least one layer of material by gravity and/or by the effect of aerodynamic pressure generated inside said closed channel, while said air outlet opening conducts the gaseous phase of said air flow outside the rigid casing.

2. A dynamic air intake according to claim 1, wherein with reference to the arrangement of use of said air intake itself with respect to said vehicle, said helmet or said safety clothing, said air inlet opening is frontal, respectively lateral, while said air outlet opening is rear and is provided inside said rigid casing, through a part of the rigid casing, so that said air outlet opening conducts said air flow outside the rigid casing, towards a corresponding air introduction opening, provided in said vehicle, said helmet or said safety clothing.

3. A dynamic air intake according to claim 1, wherein said rigid casing comprises a base body, which is fixed on said vehicle, said helmet or said protective clothing, having an intermediate part which is raised with respect to at least one support with the function of fixing to said vehicle, said helmet or said protective clothing, and in which a bottom portion is provided, having at least one opening for the outflow of the liquid water, collected in said at least one layer of material, towards a compartment below, provided between said bottom portion and an outer surface of said vehicle, said helmet or said protective clothing.

4. A dynamic air intake according to claim 3 wherein said at least one layer of material is overlapped with respect to said bottom portion of said intermediate part of said base body.

5. A dynamic air intake according to claim 3, wherein said at least one layer of material is overlapped with respect to a plate having at least one opening for the outflow of the liquid water, collected in said at least one layer of material, and in that said plate is removably overlapped with respect to said bottom portion of said intermediate part of said base body, said openings of said plate and of said bottom portion substantially corresponding to each other.

6. A dynamic air intake according to claim 3, wherein said at least one layer of material is overlapped with respect to a plate having at least one opening for the outflow of the liquid water, collected in said at least one layer of material, and in that said plate is removably supported with respect to said base body and forms said bottom portion of said intermediate part of said base body.

7. A dynamic air intake according to claim 3, further comprising: a first plate having at least one water outflow opening and movably supported with respect to said base body, between at least two longitudinal sliding positions with respect to the base body, said first plated forming said bottom portion of said intermediate part of the said base body; and a second plate, superiorly supporting said at least one layer of material and having at least one water outflow opening, said second plate being supported and fixed with respect to said base body and standing above said first plate, so that said at least one opening of said first plate, in one of said two longitudinal sliding positions of the plate, corresponds, at least in part, to said at least one opening of said second plate, allowing the outflow of the liquid water and/or the gaseous air through the openings themselves, while in the other of said two longitudinal sliding positions of said first plate, said at least one opening of said first plate does not correspond to said at least one opening of said second plate, thus not allowing the outflow of the liquid water and/or the gaseous air through the openings.

8. A dynamic air intake according to claim 1, further comprising water/air filter separation baffle means, made of liquid water and water vapour absorbing material and permeable to air, which obstruct at least partially the cross section of said closed channel for the passage of the air flow passing between said inlet opening and said outlet opening.

9. A dynamic air intake according to claim 1, futher comprising heating means, arranged close to said air inlet opening.

10. A dynamic air intake according to claim 1, wherein said rigid casing comprises, frontally at said air inlet opening at least one longitudinal groove, communicating with said closed channel, which collects a part of rainwater and/or the liquid water suspended and contained in the open air which is introduced into said air inlet opening.

11. A dynamic air intake according to claim 1, wherein said rigid casing comprises a base body, having a structure substantially including at least one resting leg and on which a corresponding hollow cover is elastic-snappingly engaged, the cover forming with said base body a rigid box structure, which has a front air flow inlet opening and a rear air outlet opening, which conducts said air flow to the outside of said rigid casing.

12. A dynamic air intake according to claim 11 wherein said rigid casing comprises, at and below said air inlet opening, at least one longitudinal groove, which communicates with a compartment below an intermediate part of said base body, said intermediate part being raised with respect to at least one of the resting surfaces of at east one support of said base body.

13. A dynamic air intake according to claim 11, wherein said rigid casing comprises a pair of lateral doors, provided at an intermediate part of said base body, and which are movable between a closed position and an open position, with respect to the rigid casing, and in that when said lateral doors are in the closed position, the later doors prevent the air flow to outflow to the outside of said rigid casing.

14. A dynamic air intake according to claim 1, wherein said at least one layer of material is made of a porous rigid material, and is removably arranged at an opening provided in an intermediate part of a base body of the rigid casing, and is maintained by means of protrusions provided in an inner part of a hollow cover.

* * * * *